(12) United States Patent
Cook et al.

(10) Patent No.: US 11,099,031 B2
(45) Date of Patent: Aug. 24, 2021

(54) METHODS AND APPARATUS FOR DETERMINING THE ZERO RATE OUTPUT OF A SENSOR USING A LEARNING ALGORITHM

(71) Applicant: IDHL Holdings, Inc., Wilmington, DE (US)

(72) Inventors: Bryan A. Cook, Silver Spring, MD (US); Yun Li, Clarksburg, MD (US)

(73) Assignee: IDHL Holdings, Inc., Wilmington, DE (US)

( * ) Notice: Subject to any disclaimer, the term of this patent is extended or adjusted under 35 U.S.C. 154(b) by 237 days.

(21) Appl. No.: 16/466,727

(22) PCT Filed: Dec. 13, 2017

(86) PCT No.: PCT/US2017/066077
§ 371 (c)(1),
(2) Date: Jun. 5, 2019

(87) PCT Pub. No.: WO2018/118574
PCT Pub. Date: Jun. 28, 2018

(65) Prior Publication Data
US 2019/0293451 A1 Sep. 26, 2019

Related U.S. Application Data

(60) Provisional application No. 62/436,187, filed on Dec. 19, 2016.

(51) Int. Cl.
*G01C 25/00* (2006.01)
*G01C 19/00* (2013.01)
*G06F 3/046* (2006.01)
*G06F 3/0346* (2013.01)

(52) U.S. Cl.
CPC ............. *G01C 25/00* (2013.01); *G01C 19/00* (2013.01); *G01C 25/005* (2013.01); *G06F 3/0346* (2013.01)

(58) Field of Classification Search
CPC ...... G01C 25/00; G01C 19/00; G01C 25/005; G06F 3/046
See application file for complete search history.

(56) References Cited

U.S. PATENT DOCUMENTS

| | | |
|---|---|---|
| 7,158,118 B2 | 1/2007 | Liberty |
| 2004/0268393 A1 | 12/2004 | Hunleth et al. |
| 2006/0262116 A1 | 11/2006 | Moshiri et al. |
| 2007/0035518 A1 | 2/2007 | Francz et al. |
| 2009/0033807 A1 | 2/2009 | Sheng et al. |
| 2011/0178707 A1 | 7/2011 | Sachs et al. |
| 2011/0301900 A1* | 12/2011 | Patel ............... G01C 25/00 702/104 |
| 2012/0287351 A1 | 11/2012 | Francz et al. |
| 2013/0066578 A1* | 3/2013 | Tu ............... G01C 25/005 702/87 |
| 2015/0057959 A1* | 2/2015 | Ezekwe ........... G01C 19/5776 702/96 |
| 2015/0285835 A1* | 10/2015 | Karahan ........... G01R 35/005 73/1.38 |

* cited by examiner

*Primary Examiner* — Lixi C Simpson
(74) *Attorney, Agent, or Firm* — Julian F. Santos

(57) ABSTRACT

Methods, apparatus, and systems for calibrating the Zero Rate Offset (ZRO) of a gyroscope are disclosed.

21 Claims, 10 Drawing Sheets

METHODS AND APPARATUS FOR DETERMINING THE ZERO RATE OUTPUT OF A SENSOR USING A LEARNING ALGORITHM

CROSS REFERENCE TO RELATED APPLICATIONS

This application is a National Stage Application filed under 35 U.S.C. 371 of International Application No. PCT/US2017/066077, filed Dec. 13, 2017, which is a non-provisional of U.S. Provisional Patent Application No. 62/436,187 filed Dec. 19, 2016, each of which is incorporated herein by reference in its entirety.

FIELD OF THE INVENTION

The present invention relates to bias tracking techniques, systems, software and devices, which can be used in 3D pointing devices, as well as other types of devices.

BACKGROUND

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies, and video-on-demand. Whereas television viewers of the 1960s could typically receive about four or five over-the-air TV channels on their television sets, today's TV watchers have the opportunity to select from hundreds, thousands, and potentially millions of channels of shows and information. Video-on-demand technology, currently used primarily by cable TV operators and in hotels, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes that are neither fast nor simple. Consider again the example of television programs. When television was in its infancy, determining which program to watch was a relatively simple process primarily due to the small number of choices. One would consult a printed guide which was formatted, for example, as a series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing", whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides and their on-screen equivalent are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection.

Arguably, the cumbersome nature of the existing interface has hampered commercial implementation of some services, e.g., video-on-demand, since consumers are resistant to new services that will add complexity to an interface that they view as already too slow and complex.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection processor even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

Of particular interest for this specification are the remote devices usable to interact with such frameworks, as well as other applications and systems. As mentioned in the above-incorporated application, various different types of remote devices can be used with such frameworks including, for example, trackballs, "mouse"-type pointing devices, light pens, etc. However, another category of remote devices which can be used with such frameworks (and other applications) is 3D pointing devices. The phrase "3D pointing" is used broadly in this specification to refer to the ability of an input device to move in three (or more) dimensions in the air e.g., in front of a display screen, and the corresponding ability of the user interface to translate those motions directly into user interface commands, e.g., movement of a cursor on a display screen or altering a display screen as a function of the motion (such as in a virtual reality display controller). The transfer of data between the 3D pointing device and another device, e.g., which generates a user interface, may be performed wirelessly or via a wire connecting the 3D pointing device that device. Thus "3D pointing" differs from, e.g., conventional computer mouse pointing techniques which use a surface, e.g., a desk surface or mousepad, as a proxy surface from which relative movement of the mouse is translated into cursor movement on the computer display screen. An example of a 3D pointing device can be found in U.S. Pat. No. 7,118,518 to Matthew G. Liberty (hereafter referred to as the '518 patent), the disclosure of which is incorporated here by reference.

Cellular telephones, virtual reality, and augmented reality glasses and headsets, and other portable communications devices are now also commonly being used in 3D pointing applications for many different uses, including, but not limited to gaming applications, virtual reality (VR) and augmented reality (AR) applications, and photographic and videographic applications.

The '518 patent describes 3D pointing devices which include, for example, one or two rotational sensors and an accelerometer. The rotational sensor(s) are used, as described in more detail below, to detect an angular rate at which the 3D pointing device is being rotated by a user. However, the output of the rotational sensor(s) does not perfectly represent the angular rate at which the 3D pointing device is being rotated due to, for example, bias (also sometimes referred to as "zero-rate offset" or ZRO) in the sensor(s)' outputs. For example, when the 3D pointing device is motionless, the rotational sensor(s) will typically have a non-zero output due to their bias. If, for example, the 3D pointing device is used as an input to a user interface, e.g., to move a cursor or to display a virtual reality scene, this will have the undesirable effect of causing the cursor drifting across the screen when the user intends for the cursor to remain stationary or for the VR scene to drift when it should remain stationary. Thus, in order to provide a 3D pointing device which accurately reflects the user's intended movement, estimating and removing bias from sensor output is highly desirable. Moreover, other devices, in addition to 3D pointing devices, may benefit from being able to estimate and compensate for the bias of inertial sensors. Making this process more challenging is the fact that the bias is different from sensor to sensor and, even for individual sensors, is time-varying, e.g., due to changes in temperature.

Many ZRO algorithms do not directly solve for the temperature slope, but try to dynamically learn ZRO when the device is stable, i.e., stationary, and continually refine this estimate. This works well if the device is stable often, but does not work if the device is in continuous motion for an extended period time after being stable.

It is common to have factory calibration of a sensor that will calibrate over temperature. However, this type of ZRO compensation has many disadvantages:

It has a high cost of calibration, because the device much be measured at multiple temperatures. This requires more equipment and takes substantially more time than performing no calibration, or performing calibration at a single temperature.

The temperature performance could change when the device is mounted, or over time, so having a dynamic algorithm on the device can keep the temperature slope calibrated.

Most direct approaches to learning the temperature slope require a lot of RAM and processing, and, accordingly, there is still room for improvement in the area of bias estimation in particular for devices which are moving continuously for some period of time, e.g., robotic devices like robotic vacuum cleaners.

BRIEF DESCRIPTION OF THE DRAWINGS

A more detailed understanding may be had from the detailed description below, given by way of example in conjunction with drawings appended hereto. Figures in description, are examples. As such, the Figures and the detailed description are not to be considered limiting, and other equally effective examples are possible and likely. Furthermore, like reference numerals in the figures indicate like elements, and wherein.

DETAILED DESCRIPTION

Figure 1:
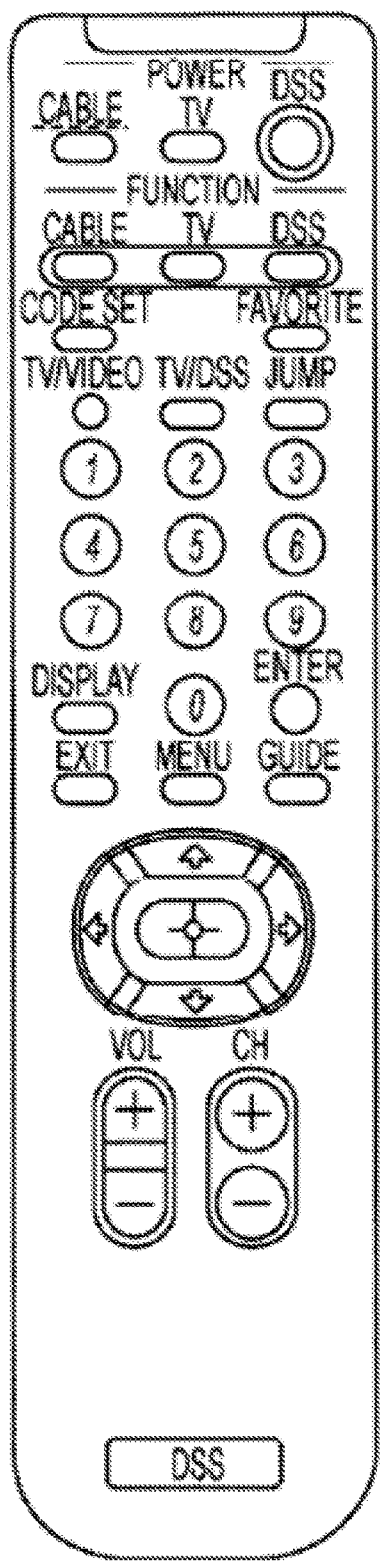
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device according to one of the exemplary embodiments described below. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
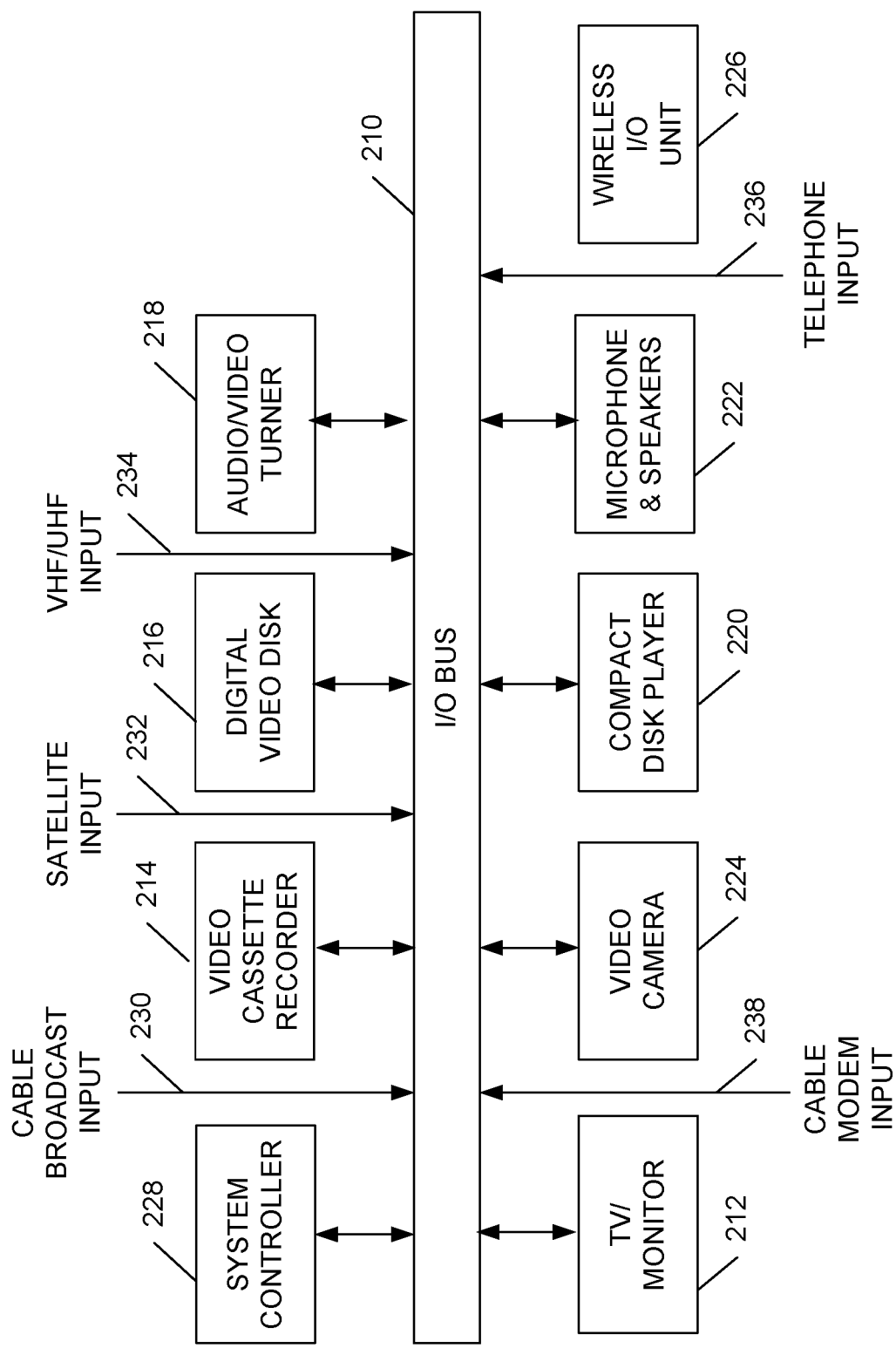
FIG. 2 depicts an exemplary media system in which exemplary embodiments can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. patent application "A Control Framework with a Zoomable Graphical User Interface for Organizing, Selecting and Launching Media Items". Alternatively, remote devices in accordance with the present invention can be used in conjunction with other systems, for example computer systems including, e.g., a display, a processor and a memory system or with various other systems and applications.

Figure 3:
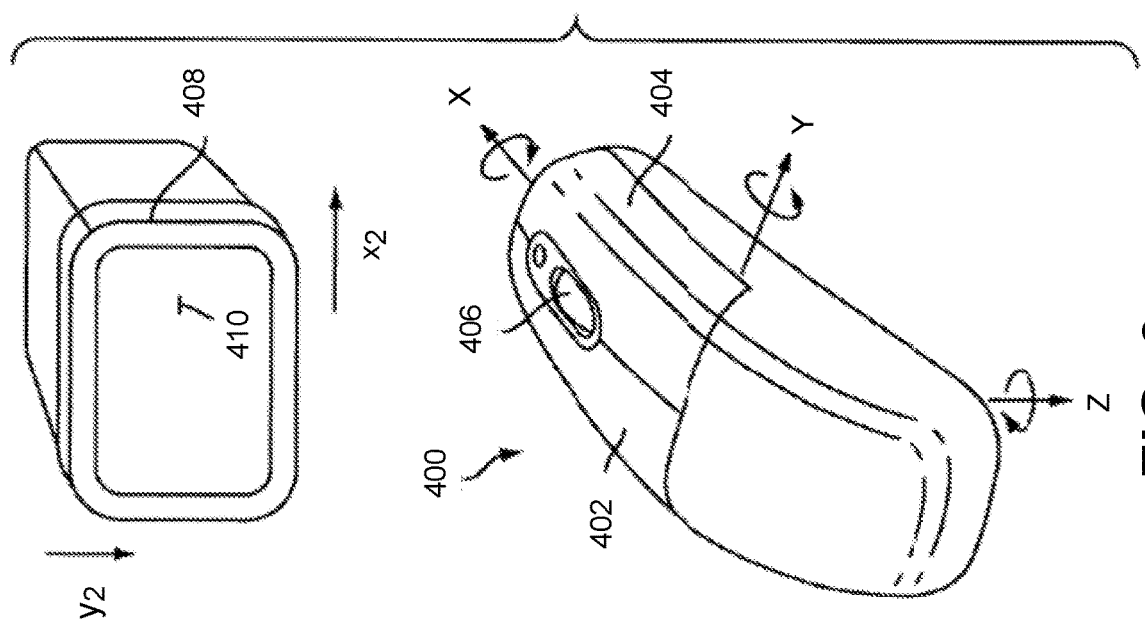
FIG. 3 shows a 3D pointing device in which exemplary embodiments can be implemented.

As mentioned in the Background section, remote devices which operate as 3D pointers are of particular interest for the present specification. Such devices enable the translation of movement, e.g., gestures or pointing, into commands to a user interface. An exemplary 3D pointing device 400 is depicted in FIG. 3. Therein, user movement of the 3D pointing can be defined, for example, in terms of a combination of x-axis attitude (roll), y-axis elevation (pitch) and/or z-axis heading (yaw) motion of the 3D pointing device 400. In addition, some exemplary embodiments of the present invention can also measure linear movement of the 3D pointing device 400 along the x, y, and z axes to generate cursor movement or other user interface commands. In the exemplary embodiment of FIG. 3, the 3D pointing device 400 includes two buttons 402 and 404 as well as a scroll wheel 406, although other exemplary embodiments will include other physical configurations. According to exemplary embodiments of the present invention, it is anticipated that 3D pointing devices 400 will be held by a user in front of a display 408 and that motion of the 3D pointing device 400 will be translated by the 3D pointing device into output which is usable to interact with the information displayed on display 408, e.g., to move the cursor 410 on the display 408. For example, rotation of the 3D pointing device 400 about the y-axis can be sensed by the 3D pointing device 400 and translated into an output usable by the system to move cursor 410 along the y2 axis of the display 408. Likewise, rotation of the 3D pointing device 408 about the z-axis can be sensed by the 3D pointing device 400 and translated into an output usable by the system to move cursor 410 along the x2 axis of the display 408. It will be appreciated that the output of 3D pointing device 400 can be used to interact with the display 408 in a number of ways other than (or in addition to) cursor movement, for example it can control cursor fading, volume or media transport (play, pause, fast-forward and rewind). Input commands may include operations in addition to cursor movement, for example, a zoom in or zoom out on a particular region of a display. A cursor may or may not be visible. Similarly, rotation of the 3D pointing device 400 sensed about the x-axis of 3D pointing device 400 can be used in addition to, or as an alternative to, y-axis and/or z-axis rotation to provide input to a user interface.

Figure 4:
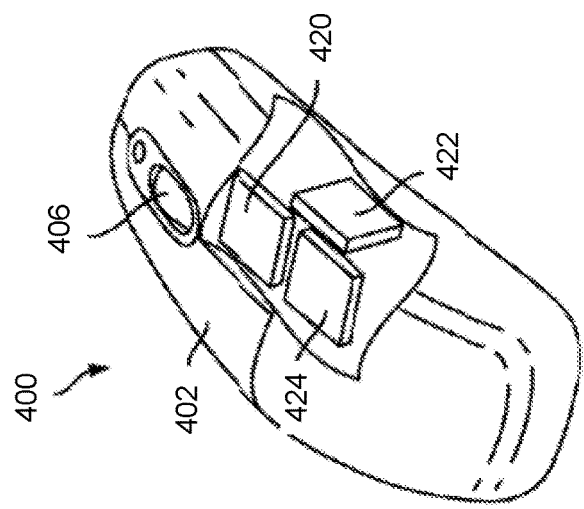
FIG. 4 illustrates a cutaway view of the 3D pointing device in FIG. 4 including two rotational sensors and one accelerometer.

According to one purely illustrative exemplary embodiment of the present invention, two rotational sensors 420 and 422 and one accelerometer 424 can be employed as sensors in 3D pointing device 400 as shown in FIG. 4. Although this exemplary embodiment employs inertial sensors, it will be appreciated that the present invention is not so limited and examples of other types of sensors which can be used in conjunction with other exemplary embodiments are provided below. The rotational sensors 420 and 422 can, for example, be implemented using ADXRS150 or ADXRS401 sensors made by Analog Devices. It will be appreciated by those skilled in the art that other types of rotational sensors can be employed as rotational sensors 420 and 422 and that the ADXRS150 and ADXRS401 are purely used as an illustrative example.

Unlike traditional gyroscopes, these exemplary rotational sensors use MEMS technology. A 1-axis MEMS Coriolis vibratory gyroscope provides a resonating mass which is attached to a frame so that it can resonate only along one direction. The resonating mass is displaced when the body to which the sensor is affixed is rotated around the sensor's sensing axis. This displacement can be measured using the Coriolis acceleration effect to determine an angular velocity associated with rotation along the sensing axis. If the rotational sensors 420 and 422 have a single sensing axis (as for example the ADXRS150s), then they can be mounted in the 3D pointing device 400 such that their sensing axes are aligned with the rotations to be measured. For an exemplary embodiment of the present invention, this means that rotational sensor 422 is mounted such that its sensing axis is parallel to the y-axis and that rotational sensor 420 is mounted such that its sensing axis is parallel to the z-axis as shown in FIG. 4.

It will be appreciated that different sensor packages (often referred to in the relevant industries as Inertial Measurement Units (IMUs) may be available which could lead to other exemplary implementations. For example, the two 1-D rotational sensors 420 and 422 could be replaced by a single, 2D rotational sensor package which provides outputs of rotational motion along, e.g., the y and z axes. One exemplary 2-D rotational sensor is the InvenSense IDG-300, although it will be appreciated that other sensors/sensor packages may also be used. An exemplary 3-D rotational sensor is the InvenSense IMU-3000. The rotational sensors 420, 422 can be 1-D, 2-D or 3-D sensors. The accelerometer 424 can, for example, be a 3-axis linear accelerometer, although a 2-axis linear accelerometer could be used by assuming that the device is measuring gravity and mathematically computing the remaining 3rd value. Additionally, the accelerometer(s) and rotational sensor(s) could be packaged together into a single sensor package. Other variations of sensors and sensor packages may also be used in conjunction with these exemplary embodiments.

Figure 5:
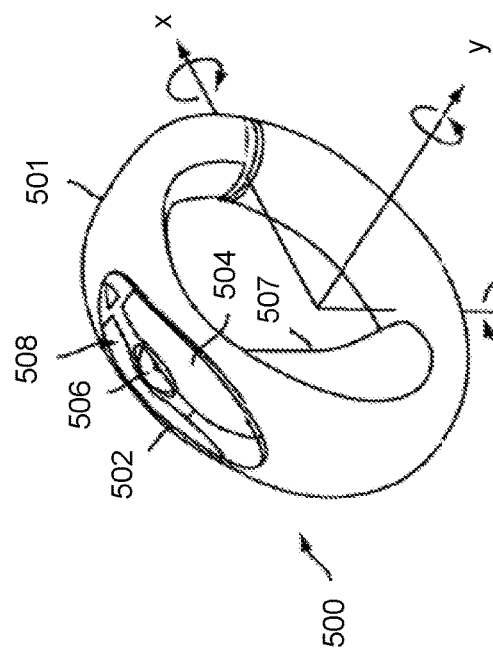
FIG. 5 shows another 3D pointing device in which exemplary embodiments can be implemented.

The exemplary embodiments are not limited to the industrial design illustrated in FIGS. 3 and 4, but can instead be deployed in any industrial form factor, another example of which is illustrated as FIG. 5. In the exemplary embodiment of FIG. 5, the 3D pointing device 500 includes a ring-shaped housing 501, two buttons 502 and 504 as well as a scroll wheel 506 and grip 507, although other exemplary embodiments may include other physical configurations. The region 508 which includes the two buttons 502 and 504 and scroll wheel 506 is referred to herein as the "control area" 508, which is disposed on an outer portion of the ring-shaped housing 501.

Figure 6:
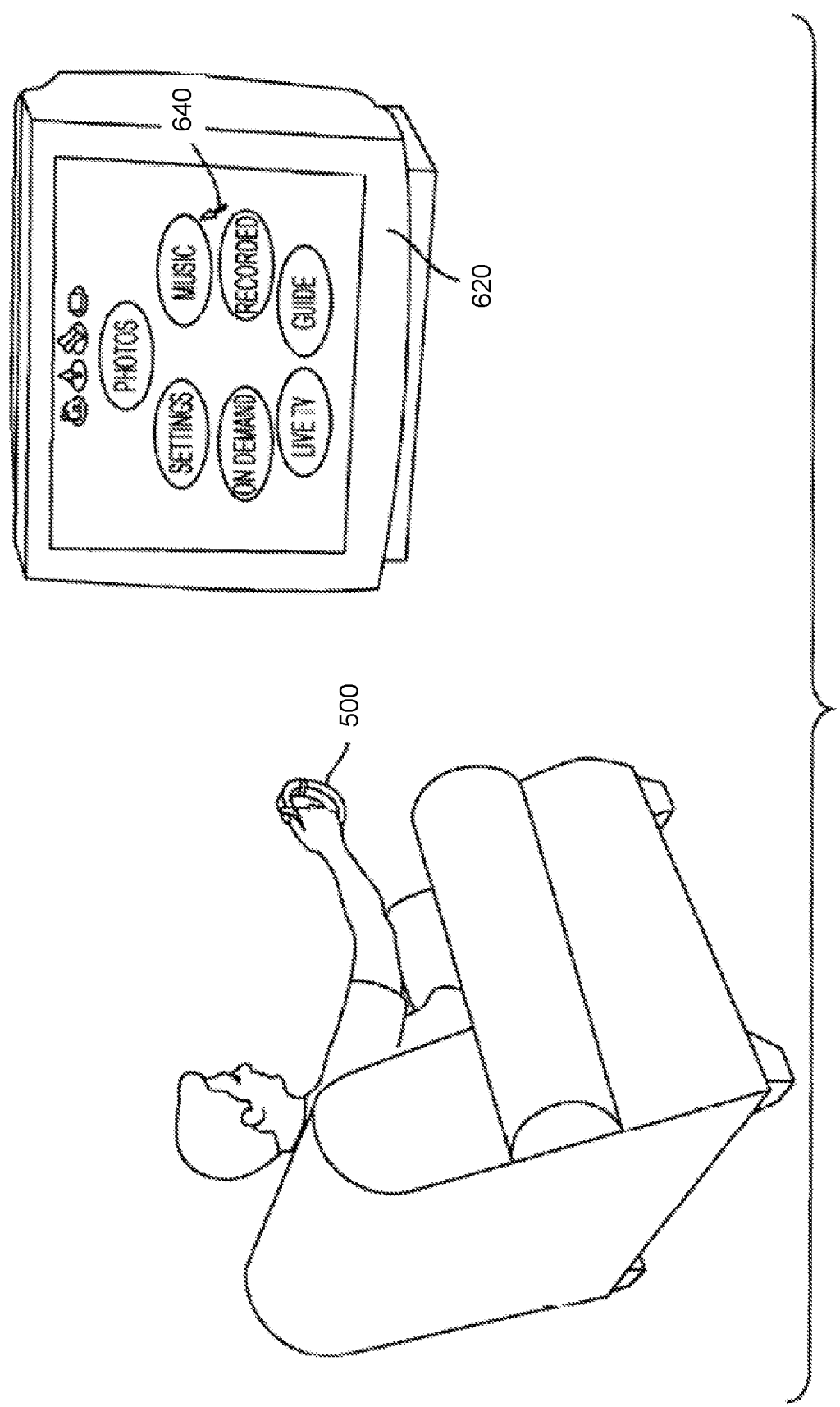
FIG. 6 depicts the 3D pointing device of FIG. 5 being used as part of a "10 foot" interface.

More details regarding this exemplary embodiment can be found in U.S. patent application Ser. No. 11/480,662, entitled "3D Pointing Devices", filed on Jul. 3, 2006, the disclosure of which is incorporated here by reference. Such devices have numerous applications including, for example, usage in the so-called "10 foot" interface between a sofa and a television in the typical living room as shown in FIG. 6. Therein, as the 3D pointing device 500 moves between different positions, that movement is detected by one or more sensors within 3D pointing device 200 and transmitted to the television 620 (or associated system component, e.g., a set-top box (not shown)). Movement of the 3D pointing device 500 can, for example, be translated into movement of a cursor 640 displayed on the television 620 and which is used to interact with a user interface. Details of an exemplary user interface with which the user can interact via 3D pointing device 500 can be found, for example, in the above-incorporated U.S. patent application Ser. No. 10/768, 432 as well as U.S. patent application Ser. No. 11/437,215, entitled "Global Navigation Objects in User Interfaces", filed on May 19, 2006, the disclosure of which is incorporated here by reference.

One challenge faced in implementing exemplary 3D pointing devices 400 in accordance with these exemplary embodiments is to employ components, e.g., rotational sensors 502 and 504, which are not too costly, while at the same time providing a high degree of correlation between movement of the 3D pointing device 400, a user's expectation regarding how the user interface will react to that particular movement of the 3D pointing device and actual user interface performance in response to that movement. For example, if the 3D pointing device 400 is not moving, the user will likely expect that the cursor ought not to be drifting across the screen. Likewise, if the user rotates the 3D pointing device 400 purely around the y axis, she or he would likely not expect to see the resulting cursor movement on display 408 contain any significant x-axis component.

To achieve these, and other, aspects of exemplary embodiments of the present invention, various measurements and calculations are performed, e.g., by the handheld device 400, which are used to adjust the outputs of one or more of the sensors 420, 422 and 424 and/or as part of the input used by a processor to determine an appropriate output for the user interface based on the outputs of the sensors 420, 422 and 424. These measurements and calculations are used to compensate for factors which fall broadly into two categories: (1) factors which are intrinsic to the 3D pointing device 400, e.g., errors associated with the particular sensors 420, 422 and 424 used in the device 400 or the way in which the sensors are mounted in the device 400 and (2) factors which are not intrinsic to the 3D pointing device 400, but are instead associated with the manner in which a user is using the 3D pointing device 400, e.g., linear acceleration, tilt and tremor. Some exemplary techniques for handling these effects are described in the above-incorporated by reference '518 patent and in U.S. Patent Publication 20090033807, the disclosure of which is also incorporated here by reference. However, the following exemplary embodiments provide additional techniques for handling the bias or offset error contributions to sensed motion which were described in the Background section above.

Zero-Rate Output Determination

As mentioned above, it is desirable to provide techniques that learn the temperature slope and use the learned temperature slope to update the ZRO so that bias offset can be correctly compensated for. Although the description herein focuses primarily on 3D pointing devices and interfaces with which such devices can interoperate, the ZRO determination and update techniques discussed herein may be implemented in other devices, for example, a robotic vacuum cleaner, a cellular telephone, a car, or any other device.

Having the correct gyroscope ZRO is very important to sensor fusion accuracy. As previously noted, ZRO is known to change with temperature. Most of these changes vary fairly linearly with temperature. In accordance with an embodiment, a recursive least-squares (RLS) algorithm is used to learn the best fit for the slope of ZRO vs. temperature (the ZRO temperature slope) and then that result is applied when in operation to adjust the ZRO offset applied to the raw output of the gyroscope(s) as a function of temperature to achieve superior gyroscope accuracy and sensor fusion performance.

Figure 7:
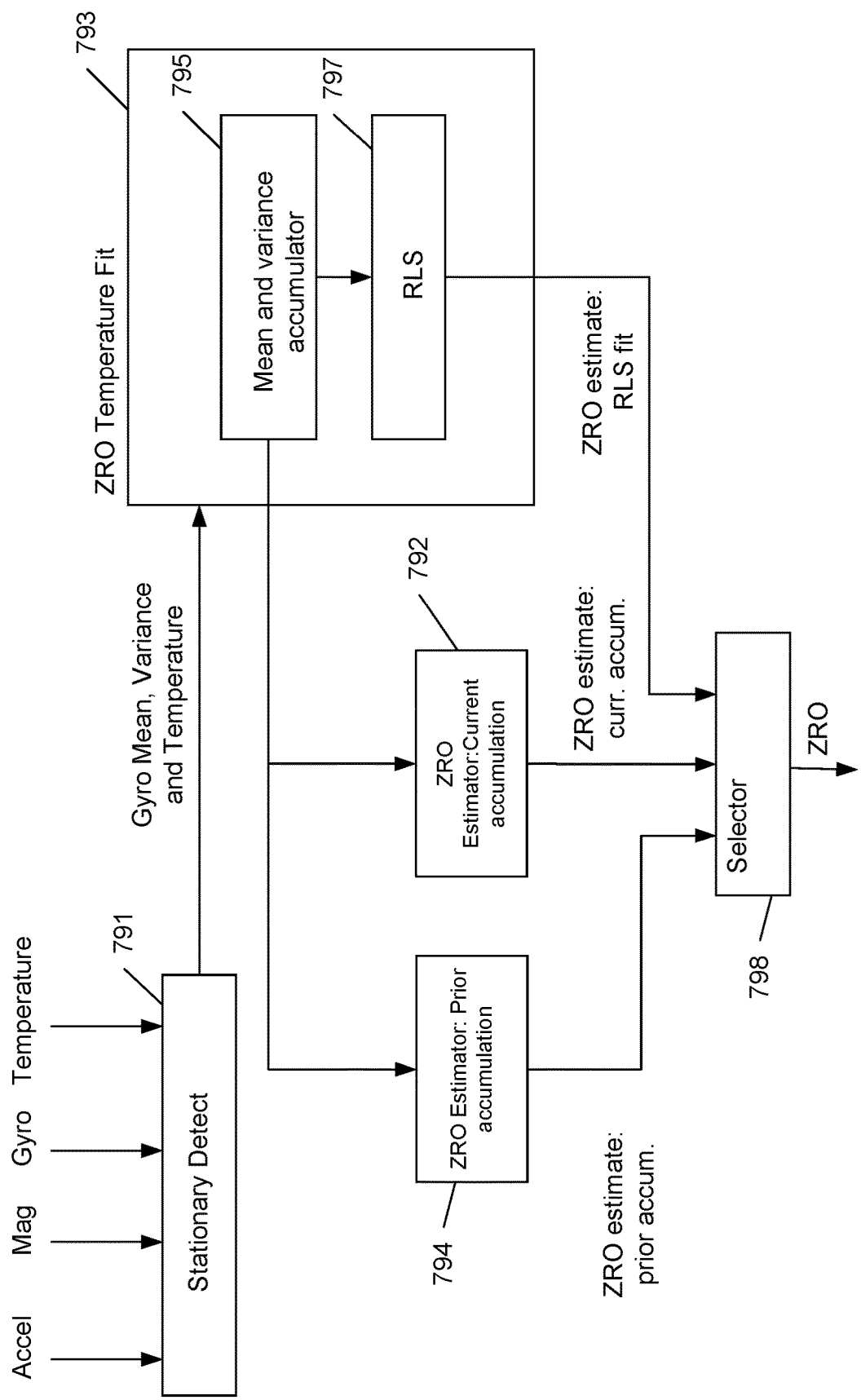
FIG. 7 is a block diagram showing components of an exemplary processing system in accordance with an embodiment.

With reference to FIG. 7, a method and apparatus for adjusting ZRO as a function of temperature in accordance with an exemplary embodiment can be considered to comprise two main components, a Stationary Detect component 791 and a ZRO Temperature Fit component 793. The Temperature Fit component 793 includes a Mean and Variance Accumulator sub-component 795 and a Recursive Least Squares (RLS) calculator sub-component 797.

Each component may be comprised of one or more software modules running on a processor, including a general purpose computer, or may be composed of dedicated hardware components for performing the functions described hereinbelow, including, but not limited to, ASICs, state machines, logical circuits, analog circuits, digital circuits, processors, or may be a combination of any of the above-noted elements.

The inputs to the Stationary Detect component 791 are the calibrated values of the sensors, e.g., accelerometer(s), magnetometer(s), and gyroscope(s). The Stationary Detect component 791 receives the motion data and will ultimately classify a region as stationary within a certain threshold. In the process, it will compute the mean and variance of the mean (sometimes simply called variance herein) for that region and send the mean, variance, and current temperature to the Mean and Variance Accumulator 795 of the ZRO Temperature Fit component 793. Algorithms for determining that the device is stationary are known in the related arts and will not be discussed herein.

The Mean and Variance Accumulator 795 receives the 3-tuple data sets of mean, variance, and temperature from the Stationary Detect component 791 and may further accumulate data corresponding to a single temperature to reduce the overall number of data points that ultimately appear in the RLS fit.

The Mean and Variance Accumulator 795 supplies the mean, variance, and temperature 3-tuple data sets to the RLS Calculator component 797 of the RLS fit component 793, which builds an RLS fit from those data sets.

In more detail, the variance of the mean of the gyroscope output may be defined as follows:

$$\text{varOfMean} = \text{var(gyro)}/N,$$

where
  N is the number of accumulated gyroscope measurements; and
  var(gyro) is the square of the standard deviation of the accumulated gyroscope measurements output, i.e., $=\text{stdev(gyro)}^2$.

This formulation of variance may be used for the accumulations generated by both the Stationary Detect component 791 and the accumulations generated by the Mean and Variance Accumulator 795.

In embodiments, the Stationary Detect component 791 collects data and sends data to the Temperature Fit component 793 for each of the axes of detection (conventionally, three orthogonal axes).

In embodiments, the Stationary Detect component 791 may send a data set to the Mean and Variance Accumulator 795 at the end of a predetermined period of stability regardless of whether the device continues to remains stationary thereafter. The Mean and Variance Accumulator may then combine consecutive data sets from the Stationary Detect component at the same temperature into a single accumulation data set based on the larger set of gyroscope measurements.

In yet other embodiments, the Mean and Variance Accumulator 795 may be configured so that, when it receives consecutive 3-tuple data sets from two distinct but consecutive stationary periods having the same temperature (i.e., within a predetermined temperature range), it combines those two data sets into a single larger accumulation data set and then sending the larger accumulation data set to the RLS Calculator for updating the RLS fit.

In yet even further embodiments, the Mean and Variance Accumulator 795 also may send 3-tuple data sets to the RLS Calculator 797 at the end of a predetermined period of stability regardless of whether the device continues to remains stationary thereafter.

In embodiments, if the Mean and Variance Accumulator 795 is notified of a temperature change by the Stationary Detect component 791 while the device remains stationary (e.g., a 3-tuple of mean, variance, and temperature is received for which the temperature change as compared to the temperature at the start of the accumulation is larger than a given threshold), it closes out the current accumulation and commences a new accumulation at the new temperature.

The threshold for a temperature change may be set at any reasonable interval (e.g., 1 degree Fahrenheit).

In other embodiments, the Stationary Detect component 791 may not perform any accumulation, but rather only detect when the device is stationary and, when the device is stationary, feed the gyroscope measurements and temperature measurements directly to the Mean and Variance Accumulator 795, and allow the Mean and Variance Accumulator to perform all accumulation of the gyroscope measurement data to produce the mean, variance and temperature 3-tuples for building the RLS fit.

In any of the above-described embodiments, the ZRO Temperature Fit component 793 uses that data to update a ZRO temperature slope RLS fit.

Then, at any time during operation of the device, the Temperature Fit component 793 can receive a current temperature reading and return the best ZRO estimate from the fit that it is dynamically maintaining.

More specifically turning to the math, let us call the accumulated state of the mean for a given temperature as maintained in the Mean and Variance Accumulator 795 "mean". Further, let us call the state of the variance of the mean for a given temperature as maintained in the Mean and Variance Accumulator 795 "var". Let us further call the new mean being received from the Stationary Detect component 791 "newMean" and the new variance of the mean being received from the Stationary Detect component 791 "newVar". Finally, let us further define a term, u, as:

$$u = \text{newVar}/\text{newVar} + \text{var}$$

Then, updating the mean and variance of the mean for a given temperature as maintained by the Mean and Variance Accumulator 795 may be performed as follows:

$$\text{mean} = \text{mean}*u + \text{newMean}*(1-u); \text{ and}$$

$$\text{var} = u^2*\text{var} + (1-u)^2*\text{newVar}$$

In one exemplary embodiment, for each temperature, the Mean and Variance Accumulator 795 accumulates all the stationary input sensor measurements that are taken when the gyroscope is at the same temperature.

When Mean and Variance Accumulator 795 receives data from the Stationary Detect component 791 that is for a different temperature than in the immediately preceding report from the Stationary Detect component (e.g., the temperature changes beyond some predefined threshold), the Mean and Variance Accumulator 795 sends the 3-tuple of the accumulated mean and variance for the temperature point of the now-completed data set to the RLS fit component 797 for use in updating the ZRO temperature fit (as will be discussed in more detail below). It also may save the data set for later use by a prior accumulation estimator 797, as will be discussed in more detail further below.

As mentioned above, in alternate embodiments, the Stationary Detect component may only perform the function of determining when the device is stationary and the Mean and Variance Accumulator 795 may receive gyroscope (and temperature) measurement data directly and perform all accumulation functions. In embodiments of this type, the Mean and Variance Accumulator may have two state variables for each channel (i.e., each gyroscope), namely, "mean" and "m2", and a variable "N" for the number of samples accumulated. For each new measurement, "s", the variables may be updated as follows:

$N_{new} = N_{old} + 1$ $delta1 = s - mean_{old}$ $mean_{new} = mean_{old} + delta1/N_{new}$ $delta2 = s - mean_{new}$ $m2_{new} = m2_{old} + delta1 \cdot delta2$ The variance of the samples may be computed as:

$var = m2/N.$

Each new measurement from the gyroscope that is declared stationary by the Stationary Detect block 791 will be accumulated by the Mean and Variance Accumulator 795. When the temperature changes beyond a threshold, then any accumulated data sets will be sent to the RLS block 797 for addition to the RLS fit and saved for the Prior Accumulation estimate 794.

In embodiments, each 3-tuple data set sent to the RLS fit component 797 may also be assigned a weight as a function of its estimated accuracy. For instance, it may be desirable to give a lesser weight to a data set that corresponds to stationary periods that are shorter than others or where the device was less stationary than during other accumulations. Data sets also may be assigned decreasing weight as they age in case the temperature slope changes over time, which is expected. For instance, an accumulation data set that is based on a smaller number of measurements will generally be less reliable than a data set that is based on a greater number of samples. Likewise, a data set for which the variance of the mean is higher likely is less accurate than a data set for which the variance of the mean is lower. Thus, one may assign a weight to a given data set reported to the RLS Fit component of:

$weight = 1/var$

The weight that any given data set can be assigned may be limited to some maximum value to prevent a single data set with particularly low variance from overwhelming other data in the fit. The Mean and Variance Accumulator also may maintain statistics on what temperatures are included in the RLS fit for later use, as discussed further below.

The RLS component 797 then computes the RLS least squares best fit of temperature versus ZRO. The RLS component may generate a RLS fit for each of the three gyroscope axes.

In some embodiments, a limit may be placed on the total weight of the data sets in the RLS fit as well as the temperature statistics such that, once a sufficient number of data sets have been received to reach the maximum weight, the effect of older data sets on the RLS fit is removed as newer data sets come in.

Figure 8:
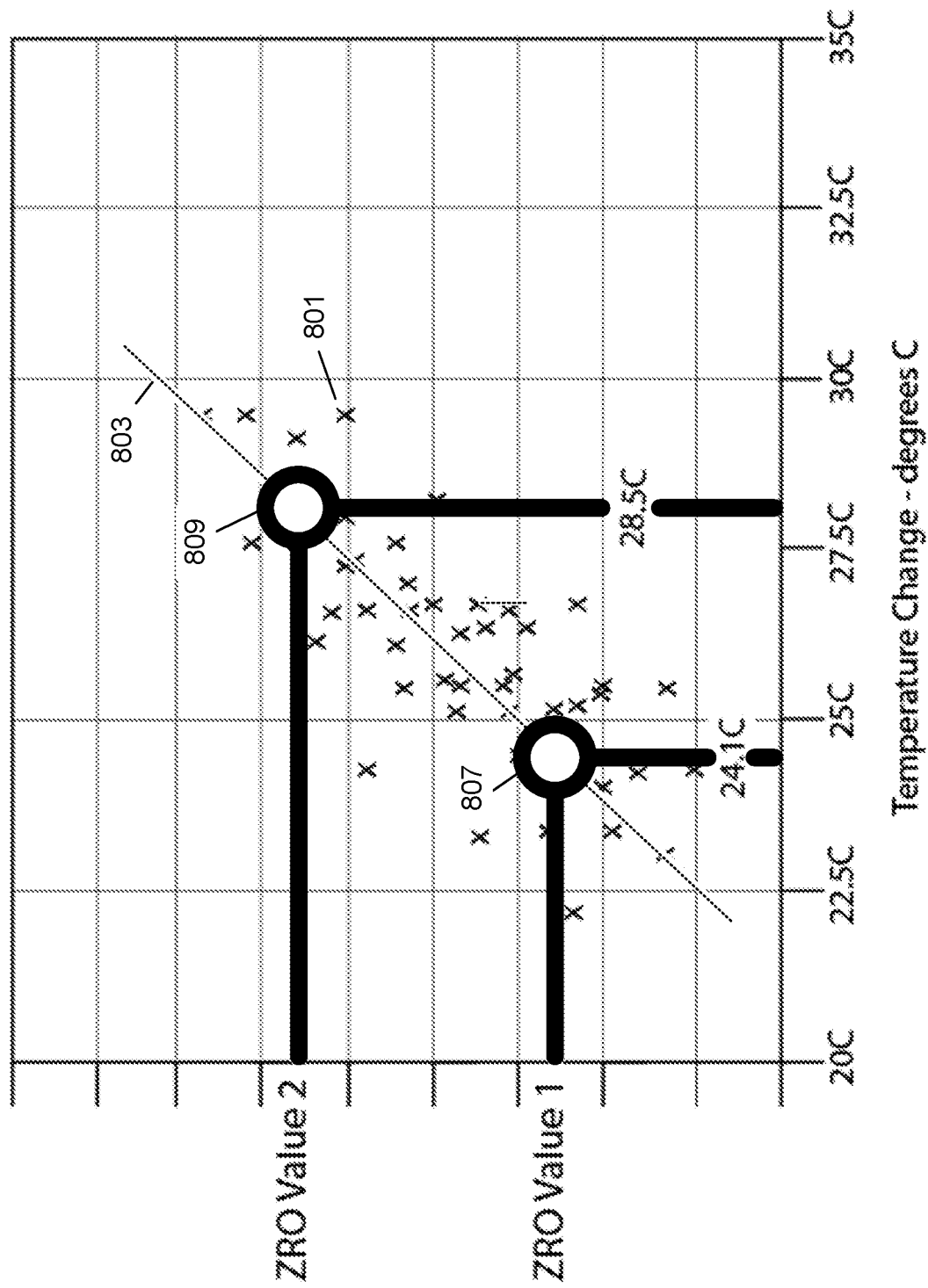
FIG. 8 is a graphical illustration of an RLS linear fit of ZRO as a function of temperature.

FIG. 8 is a graph showing an exemplary RLS linear fit of ZRO estimate as a function of temperature. Particularly, the Xs in the Figure (e.g., 801) represent the individual data sets received from the Mean and Variance Accumulator 795. The position of each X in the vertical, y, axis essentially represents the aforementioned mean of the gyroscope measurements that were used in generating that data set. The position of the data set in the horizontal, x, axis represents the temperature corresponding to that data set. Note that neither the variance nor the weight of the data set is expressly represented in FIG. 8. Line 803 represents the fit of those data sets (i.e., points on the graph) to a linear estimate of ZRO versus temperature using a linear RLS technique. For instance, points 807 and 809 represent two different ZRO estimates for two different temperatures according to the RLS fit 803, namely ZRO value 1 for temperature 24.1 Celsius and ZRO value 2 for temperature 258.5 Celsius.

The use of an RLS algorithm permits calculation of an accurate gyroscope temperature slope using very little memory since RLS does not require storage of the actual raw input data, but rather only maintenance of the accumulated results, i.e., the gyroscope temperature fit.

Then, whenever the device is in motion (not stationary) and a gyroscope reading is needed, its ZRO can be estimated (and compensated for) using the current gyroscope temperature fit to provide a more accurate result.

Many different RLS fit techniques are known and may be used in the present invention. A linear fit algorithm such as described above may be employed to simplify the process. However, quadratic and higher order algorithms may be used to generate even more accurate fits.

The following is a discussion of one exemplary linear weighted RLS technique. That may be implemented within the RLS fit component 797 to generate the RLS fit.

As previously noted, one of the advantages of an RLS technique is the minimal memory requirements for maintaining a robust ZRO estimate over a range of temperatures. As will be discussed in more detail below, this technique requires the long-term maintenance of only one 2×2 matrix (herein termed matrix A) and one 2×1 vector (herein termed vector b) to maintain the RLS fit.

One more number, a scalar herein termed P, also may be maintained. Particularly, in some embodiments, it may be useful to compute the Mean Squared Error (MSE) of the RLS fit. For example, in some embodiments described hereinbelow, it may be desirable to calculate several different ZRO estimates using different techniques (including the present RLS fit technique) and select the one of those multiples ZRO estimates that is likely the most accurate for a given context. The likely accuracy of the ZRO estimate may be represented by its MSE and, as will be described in more detail below, the scalar $\Gamma^2$ may be useful in calculating an MSE of the fit.

In any event, the weighted RLS problem with N sample points $(x_i, y_i)$ (wherein $x_i$ is temperature and $y_i$ is the estimated ZRO) and weight $w_i$, i=1, 2, ... N, is to find the slope a and offset c, to minimize the weighted Mean Square Error (MSE) of the linear fitting, $y_i = a \cdot x_i + c$:

$$MSE = \frac{1}{\sum_{i=1}^{N} w_i} \sum_{i=1}^{N} (y_i - (a \cdot x_i + c))^2 \cdot w_i.$$

The solution is given by, $$p = \begin{bmatrix} a \\ c \end{bmatrix} = \begin{bmatrix} \sum_{i=1}^{N} x_i^2 w_i & \sum_{i=1}^{N} x_i w_i \\ \sum_{i=1}^{N} x_i w_i & \sum_{i=1}^{N} w_i \end{bmatrix}^{-1} \cdot \begin{bmatrix} \sum_{i=1}^{N} x_i y_i w_i \\ \sum_{i=1}^{N} y_i w_i \end{bmatrix},$$

and the minimum MSE is:

$$MSE = \frac{1}{\sum_{i=1}^{N} w_i} \left( \sum_{i=1}^{N} y_i^2 w_i - p \cdot \begin{bmatrix} \sum_{i=1}^{N} x_i y_i w_i \\ \sum_{i=1}^{N} y_i w_i \end{bmatrix} \right).$$

For each incoming data set, matrix A, vector b and scalar $\Gamma^2$ are updated as shown in the equations below. At time zero, all three terms are empty (all zeros). When a mean and variance data set comes in, the input comprises three numbers (3-tuple), namely, (1) a temperature, x, (2) a ZRO (the mean ZRO of the measurements that went into the data set), y, and (3) a weight, w, that has been assigned to the sample such as described above (e.g., a function of the variance of the measurements that went into the data set).

$A(0,0)=A(0,0)+x^2{*}w$ $A(0,1)=A(0,1)+x{*}w$ $A(1,0)=A(1,0)+x{*}w$ $A(1,1)=A(1,1)+w$ $b(0)=b(0)+x{*}y{*}w$ $b(1)=b(1)+y{*}w$ $\Gamma^2=\Gamma^2+y{*}y{*}w$ Thus, the square of the temperature multiplied by the weight assigned to the data set is added to the current value at position 0,0 in matrix A, the temperature multiplied by the assigned weight is added to both the current value at position 0,1 and the current value at position 1,0 in matrix A, and the weight of the data set is added to the value at position 1,1 of matrix A. Hence, the value at position 1,1, of matrix A essentially is a count of the number of data sets that went into creating the RLS fit (up to any limit set by the designer).

In order to forget older data sets as newer data sets come in, as previously mentioned, forgetting factors may be introduced as follows.

If A(1, 1)>=limit
        forget=limit/A(1, 1)
        A=A*forget
        b=b*forget
        $\Gamma^2=\Gamma^2{*}$forget Next the fit is computed as:
P=A\B, where:
    \ is the matrix division, usually done via LDL or QR decomposition.

Thus, the slope of the fit is given by P(0) and the offset of the fit is given by P(1). In other words, the ZRO estimate (which is x in the equations) is a function of temperature (which is given by y in the equations) by:

y=slope*x+offset or

ZRO estimate=P(0)*temperature+P(1)

The straight line 803 in FIG. 8 is a graphical representation of this equation.

In certain circumstances, ZRO estimation techniques other than the RLS fit techniques described hereinabove may provide a more accurate ZRO estimate. Accordingly, in certain embodiments, the system may keep track of ZRO using a plurality of different ZRO estimation techniques and then choose the estimate provided by one of those techniques based on an estimation of which technique was most likely to provide the most accurate ZRO estimate based on one or more contextual factors. More particularly, in one exemplary embodiment, three different means for estimating ZRO may be maintained. The first technique for estimating ZRO may be the above-described LRS technique of maintaining an RLS fit and plugging in the current gyroscope temperature in the RLS fit. A second technique may be to estimate the ZRO based solely on the latest data set, i.e., the data set currently being accumulated by the Mean and Variance Accumulator. Particularly, if the temperature of the device at the time a gyroscope measurement is needed is substantially the same temperature as the temperature corresponding to the data that is currently being accumulated by the Mean and Variance Accumulator component 791, a ZRO estimate based on only that most recent data very well may be more accurate than an estimate based on the accumulated data of the RLS fit. In FIG. 7, this function is performed in component 792.

A third possibility is to use a ZRO estimate based on only the most recently completed data set generated by the Mean and Variance Accumulator 795 (i.e., the most recent data set reported to the RLS Fit component, as opposed to the one that is currently still being accumulated). Particularly, the most recent completed data set may provide a more accurate ZRO estimate than the data set that is currently being accumulated if, for instance, there are very few samples so far in the currently accumulated data. In FIG. 7, this function is performed in component 794.

Next, a Selection Component 798 determines which of the three ZRO estimates is likely the most accurate and selects that one. In embodiments, the selection may be based on the technique that has the lowest estimated mean square error (MSE).

For the latter two techniques (i.e., using the most recent completed data set or the data set currently being accumulated in the Mean and Variance Accumulator), the MSE may be estimated by computing the difference in temperature between the current gyroscope temperature (i.e., at the time the ZRO estimate is needed for a measurement) and the temperature corresponding to the data set, hereinafter $\Delta T$. Then, take the variance of that data set, i.e., var, as an initial estimate of its MSE and increase that starting MSE based upon the RLS slope. That is:

mseAdjusted=var+$(\Delta T{*}\text{slope})^2$

For the RLS technique, an adjusted MSE may be estimated a number of ways. According to one such way, a base MSE of the RLS fit is combined with the effective total number of data sets accumulated in the fit to arrive at an adjusted MSE.

More particularly, first, the base MSE may be defined as:

$$MSE = \frac{\Gamma^2 - \text{dot}(P, b)}{A(1, 1)},$$

where dot is the vector dot product P(0)*b(0)+P(1)*b(1)

Then, the base MSE of the RLS fit is combined with the effective total number of data sets accumulated in the fit (subject to any limit set on the total number of data sets), e.g.;

$$mseAdjusted = MSE + \frac{1}{totalWeight}$$

Thus, the fewer the number of data sets in the accumulation (i.e., the lower the totalWeight in the equation above), the higher the estimated MSE.

Then, the MSE may be further degraded if the current gyroscope temperature is outside of the temperature range for which the RLS fit is considered sufficiently robust. Particularly, techniques are known for determining a range of the input to an RLS fit over which the output is considered sufficiently robust. If the current temperature of the gyroscope is outside of that range, then the adjusted MSE may be further degraded. In one exemplary technique, let currT be the current gyroscope temperature. Furthermore, let maxT and minT define the range of temperatures in the RLS over which the fit is considered robust. In an embodiment, maxT and minT may be defined, for instance, as +/−3 standard deviations from the mean of the total number of data sets in the RLS fit, respectively. By using the same forget factor that is used by the mean and variance accumulator, it forgets temperatures at the same rate that the fit forgets sample points. Then, If $currT > maxT$ or $currT < minT$, then Final $mseAdjusted = \left\| (c - currT) * \frac{mseAdjusted}{(c - minT)} \right\|$, where $c = \frac{(minT + maxT)}{2}$.

Figure 9:
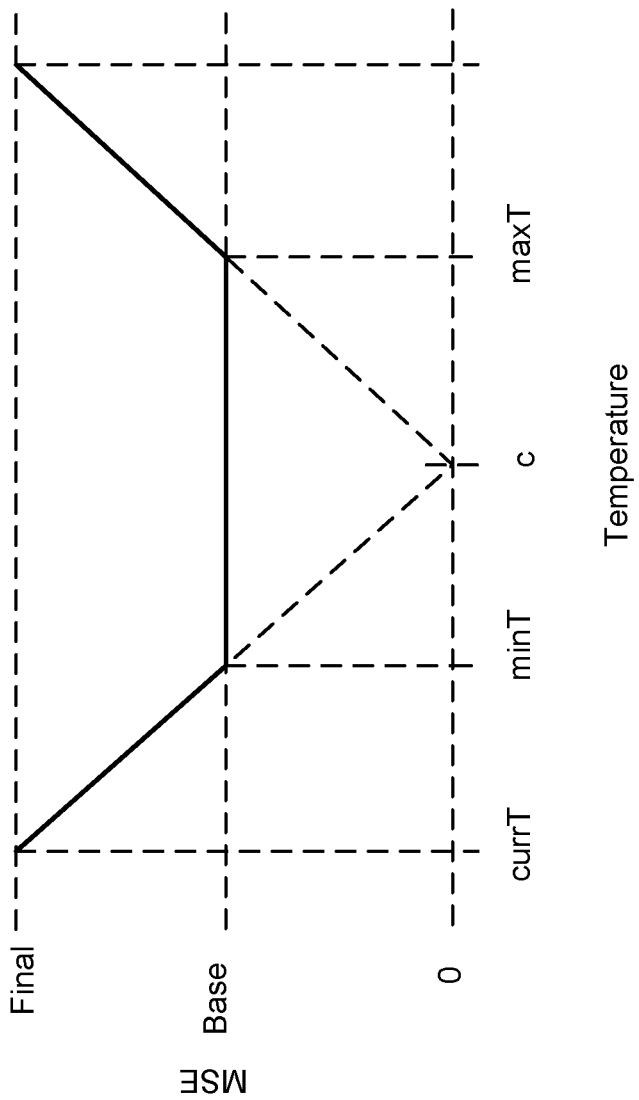
FIG. 9 is a graph illustrating the relationship of MSE as a function of temperature in accordance with an embodiment.

FIG. 9 is a graphical representation of the mathematical equations above showing the relationship of the Final adjusted MSE for the RLS fit as a function of temperature.

The selection process selects the ZRO estimate from one of the three techniques that has the smallest MSE based on the above calculations.

The RLS fit techniques described herein provide a low overhead (particularly in terms of memory requirements) method for estimating ZRO of a gyroscope.

In some embodiments, additional sensor data may be used to improve the results. For instance, camera and/or magnetometer measurements/data may be used to allow for short-term ZRO estimates. For example, camera or magnetometer data may be useful in making a robust determination about whether the device is actually stationary. For instance, slow rotation of the device that is restricted to rotation in a single plane (e.g., a robotic vacuum cleaner sitting on a perfectly horizontal floor and slowly spinning about the vertical axis of gravity) may not be sufficiently distinguishable from stationary by gyroscopes and/or accelerometers. However, a magnetometer and/or camera would be much more capable of accurately detecting such rotation, and thus would be useful in providing more robust detection of whether the device is stationary than mere gyroscope and/or accelerometer measurements.

Figure 10A:
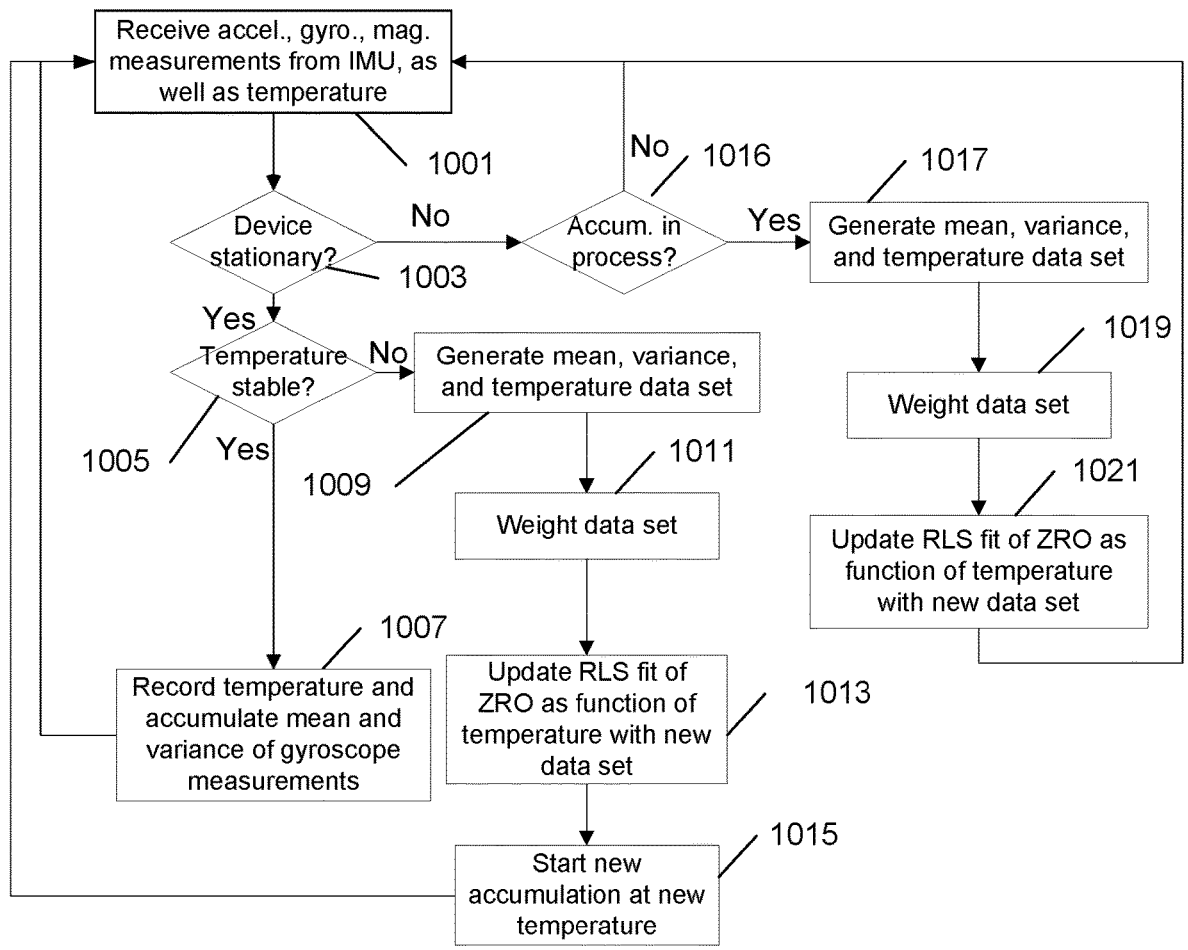
FIG. 10A is a flow diagram illustrating an exemplary process for determining ZRO as a function of temperature using an RLS fit technique in accordance with an embodiment.

FIG. 10A is a flow diagram illustrating process flow for estimating the ZRO of a gyroscope using an RLS fit in accordance with one exemplary embodiment. At 1001, gyroscope, accelerometer, and possibly magnetometer measurement data is received. This data may be received from an Inertial Measurement Unit (IMU), such as the model BN0055 manufactured by Bosch Sensortec GmbH, and may comprise calibrated measurement data for multiple axes of detection. For instance, a 9-axis IMU would provide a magnetometer measurement, an accelerometer measurement, and a gyroscope measurement for each of three orthogonal axes. In step 1003, it is determined whether the device to which the IMU is attached is stationary. If not, then the process flows to step 1016, where it is determined whether an accumulation is in process (e.g., the device had been stationary for a period, but has now moved). If not, then no action is taken with respect to generating a ZRO estimate and processing returns to step 1001 to continue to receive measurement data and wait for the device to become stationary.

If, on the other hand, an accumulation was in process, then flow proceeds to step 1017, where a data set comprising at least the mean of the accumulated data, the variance of the mean of the accumulated data, and the temperature is created. Next, at step 1019, the data set is assigned a weight, such as in any of the manners described above. Then, in step 1021, the RLS fit is updated with the new data set. Then, processing returns to step 1001.

If, on the other hand, at step 1003, the device is stationary, flow proceeds to step 1005, where it is determined if the device temperature has changed. If the temperature has not changed, then flow proceeds to step 1007, where the accumulation of data toward creating a data set for the RLS fit is continued (or commenced if this is the first measurement data that came in since the device became stationary). Then flow proceeds back to step 1001 to receive more sensor measurement data.

If, on the other hand, the temperature changed in step 1005, then flow instead proceeds through steps 1009, 1011, 1013, and 1015. Steps 1009, 1011, and 1013 are essentially the same as steps 1017, 1019, and 1021 for updating the RLS fit with the new data set. Particularly, in step 1009, a data set of the mean, variance of the mean, and the temperature is created. Next, at step 1011, the data set is assigned a weight. Then, in step 1013, the RLS fit is updated with the new data set. In addition, since the device is still stationary, at step 1015, a new accumulation is commenced at the new temperature. Then, processing returns to step 1001 to continue to receive sensor measurement data.

Figure 10B:
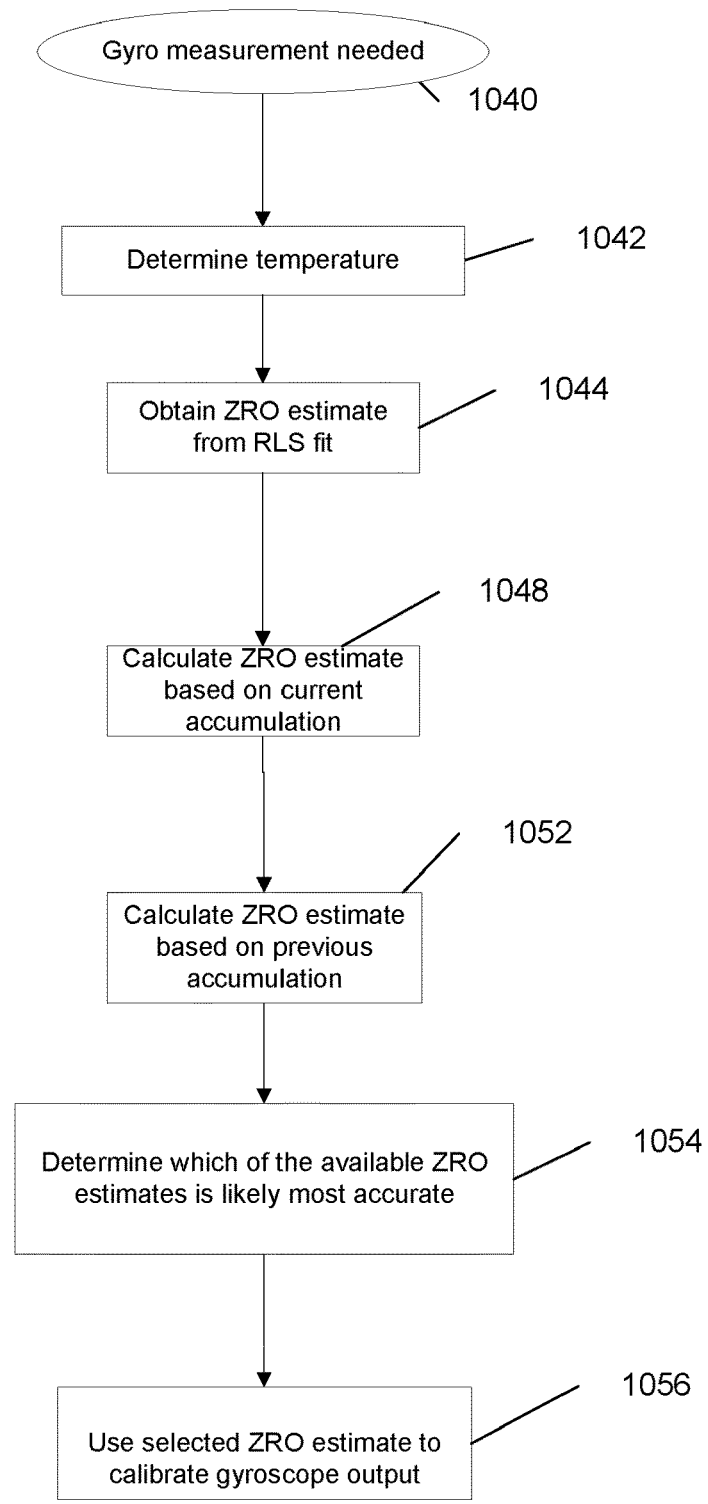
FIG. 10B is a flow diagram illustrating an exemplary process for applying a ZRO estimate to adjust the measurement of a gyroscope to compensate for ZRO in accordance with an embodiment.

FIG. 10B is a flow diagram illustrating process flow for generating a ZRO estimate for adjusting the output of the gyroscope. This process would be run whenever a measurement from the gyroscope is needed (e.g., to control a pointer or any of countless other applications for motion sensing).

The process starts at step 1040, when a gyroscope measurement is needed. At step 1042, the current temperature of the gyroscope is determined. Then, as previously described, multiple ZRO estimates will be obtained by different techniques and a determination will be made as to which technique is likely providing the most accurate ZRO estimate. More particularly, at step, 1044, the ZRO estimate from the RLS fit is retrieved. Then, in step 1048, a ZRO estimate based on the current accumulation is generated. In step 1052, a ZRO estimate is generated based on the most recently completed accumulation (the most recent data set added into the RLS fit).

Next, at step 1054, it is determined which of the three available ZRO estimates is likely most accurate. This may, for instance be done using the MSE estimations techniques described hereinabove. Finally, at step 1056, the best ZRO estimate is reported out to the processing modules that will adjust the gyroscope output result using the selected ZRO estimate and use the adjusted gyroscope output data to determine the motion of the device.

Figure 11:
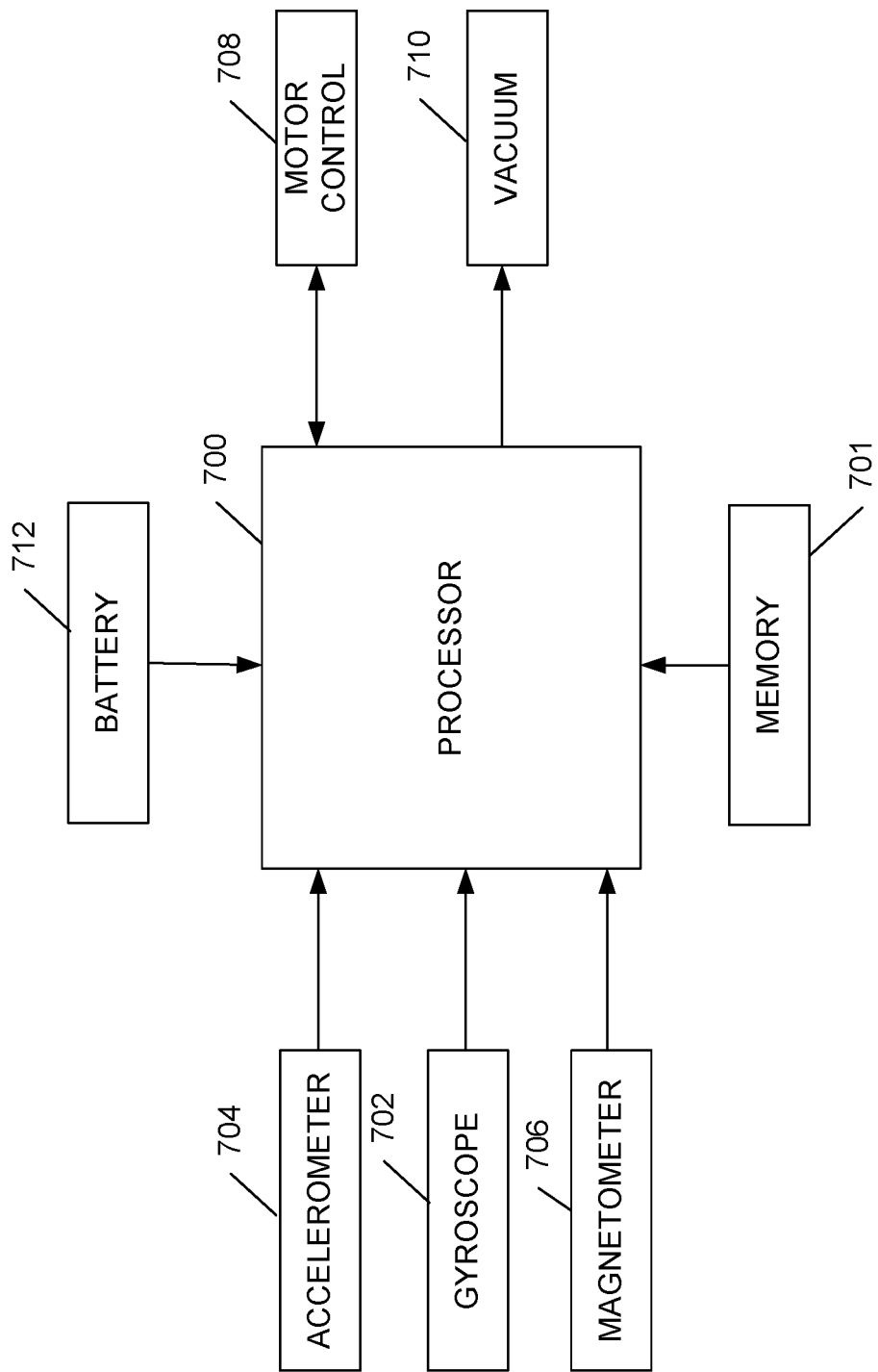
FIG. 11 is a block diagram illustrating a hardware architecture associated with an exemplary device into which the present invention can be incorporated.

Having provided a description of bias estimation in devices according to the afore-described exemplary embodiments, FIG. 11 illustrates an exemplary hardware architecture associated with such devices, e.g., a robotic vacuum, a cellular telephone or other mobile communication or electronic device, a pointing device, or other devices. Therein, a processor 700 communicates with other elements of the device including a memory 701, and various motion sensors, e.g., rotational sensor(s), e.g., gyros, 702, accelerometer 704, and magnetometer 706. The processor 700 and memory 701 can interact to execute a bias offset compensation technique that involves, among other things, learning the temperature slope associated with the particular sensors used in the device. The processor 700 can also interact with, and optionally control, other elements of the device, e.g., motor control components 708 to steer the robotic vacuum, vacuum components 710 and a battery 712.

CONCLUSION

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., a 3D pointing device or other device, which contains the sensors or the software may run on a processor or computer housed within another device, e.g., a system controller, a game console, a personal computer, etc., which is in communication with the device containing the sensors. In such a case, data may be transferred via wireline or wirelessly between the device containing the sensors and the device containing the processor which runs the software which performs the bias estimation and compensation as described above. According to other exemplary embodiments, some of the processing described above with respect to bias estimation may be performed in the device containing the sensors, while the remainder of the processing is performed in a second device after receipt of the partially processed data from the device containing the sensors.

Although the foregoing exemplary embodiments relate to sensing packages including one or more rotational sensors and an accelerometer, bias estimation techniques according to these exemplary embodiments are not limited to only these types of sensors. Instead bias estimation techniques as described herein can be applied to devices which include, for example, only accelerometer(s), optical and inertial sensors (e.g., a rotational sensor, a gyroscope or an accelerometer), a magnetometer and an inertial sensor (e.g., a rotational sensor, a gyroscope or an accelerometer), a magnetometer and an optical sensor (e.g. a camera, one or more photodiodes, one or more phototransistors), or other sensor combinations. Additionally, although exemplary embodiments described herein relate to bias estimation in the context of 3D pointing devices and applications, such techniques are not so limited and may be employed in methods and devices associated with other applications, e.g., mobile phones, medical applications, gaming, cameras, military applications, robotic devices, etc.

The above-described exemplary embodiments are intended to be illustrative in all respects, rather than restrictive, of the present invention. Thus, the present invention is capable of many variations in detailed implementation that can be derived from the description contained herein by a person skilled in the art. For example, although the foregoing exemplary embodiments describe, among other things, the use of inertial sensors to detect movement of a device, other types of sensors (e.g., ultrasound, magnetic or optical) can be used instead of, or in addition to, inertial sensors in conjunction with the afore-described signal processing. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within an RVC or remotely. In the later a case, data may be transferred via wireline or wirelessly between the RVC containing the sensors and the remote device containing the processor which runs the software which performs the scale estimation and compensation as described above. According to other exemplary embodiments, some of the processing described above with respect to bias estimation may be performed in the device containing the sensors, while the remainder of the processing is performed in a second device after receipt of the partially processed data from the device containing the sensors.

Although the foregoing exemplary embodiments relate to sensing packages including one or more rotational sensors and an accelerometer, bias estimation techniques according to these exemplary embodiments are not limited to only these types of sensors. Instead bias estimation techniques as described herein can be applied to devices which include, for example, only accelerometer(s), optical and inertial sensors (e.g., a rotational sensor, a gyroscope or an accelerometer), a magnetometer and an inertial sensor (e.g., a rotational sensor, a gyroscope or an accelerometer), a magnetometer and an optical sensor (e.g. a camera, one or more photodiodes, one or more phototransistors), or other sensor combinations. Additionally, although exemplary embodiments described herein relate to gyroscope scale calibration in the context of RVC and applications, such techniques are not so limited and may be employed in methods and devices associated with other robotic devices.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of compensating for zero rate offset (ZRO) of a gyroscope as a function of temperature, the method comprising:
   iteratively receiving a measurement generated by the gyroscope and a temperature of the gyroscope;
   iteratively receiving a measurement generated by at least one other motion sensor;
   determining when the gyroscop is stationary based on the measurements generated by the gyroscope and the measurements generated by the at least one other motion sensor;
   determining when the gyroscope is at a particular temperature based on the temperatures of the gyroscope;
   during periods in which the gyroscope is determined to be stationary and at a particular temperature, accumulating a mean and a variance of the mean of the measurements generated by the gyroscope to generate a sample data set;
   generating a weighted recursive least squares (RLS) fit of ZRO as a function of temperature based on the mean and the variance of the mean at a plurality of temperatures;

computing a ZRO estimate using the weighted RLS fit and a current temperature of the gyroscope; and when the gyroscope is in motion, adjusting the measurement generated by the gyroscope as a function of the ZRO estimate.

2. The method of claim 1 wherein generating the weighted RLS fit comprises weighting the sample data sets in the RLS fit as a function of any one or more of: age of the sample data set, duration of at least one of the periods corresponding to the sample data set, and/or steadiness of the gyroscope during at least one of the periods corresponding to the sample data set.

3. The method of claim 2 wherein the weighting comprises applying a forgetting factor to the corresponding sample data set as a function of age of the sample data set.

4. The method of claim 3 wherein the forgetting factor is a predetermined number of measurements generated by the gyroscope divided by a number of the measurements generated by the gyroscope accumulated in the sample data set.

5. The method of claim 1 wherein the at least one other motion sensor is an accelerometer.

6. The method of claim 5 wherein the at least one other motion sensor further comprises at least one of a magnetometer and a camera.

7. The method of claim 1 further comprising:
determining a second ZRO estimate based on a currently accumulated sample data set;
determining a third ZRO estimate based on a most recently completed sample data set;
calculating an estimated accuracy of each of the ZRO estimate, the second ZRO estimate, and the third ZRO estimate;
selecting one of the ZRO estimate, the second ZRO estimate, and the third ZRO estimate having the greatest estimated accuracy; and
applying the selected one of the ZRO estimate, the second ZRO estimate, and the third ZRO to the measurements generated by the gyroscope.

8. An apparatus for compensating for zero rate offset (ZRO) of a gyroscope as a function of temperature, the apparatus comprising:
a gyroscope;
at least one other motion sensor; and
a processor configured to:
iteratively receive a measurement generated by the gyroscope and a temperature of the gyroscope;
iteratively receive a measurement generated by at least one other motion sensor;
determine when the gyroscope is stationary based on the measurements generated by the gyroscope and the measurements generated by the at least one other motion sensor;
determine when the gyroscope is at a particular temperature based on the temperatures of the gyroscope;
during periods in which the gyroscope is determined to be stationary and at a particular temperature, accumulate a mean and a variance of the mean of the measurements generated by the gyroscope to generate a sample data set;
generate a weighted recursive least squares (RLS) fit of ZRO as a function of temperature based on the mean and the variance of the mean at a plurality of temperatures; and
compute a ZRO estimate using the weighted RLS fit and a current temperature of the gyroscope; and when the gyroscope is in motion, adjusting the measurements generated by the gyroscope as a function of the ZRO estimate.

9. The apparatus of claim 8 wherein the processor is configured to generate the weighted RLS fit by weighting the sample data sets in the RLS fit as a function of any one or more of: age of the sample data set, duration of at least one of the periods corresponding to the sample data set, and/or steadiness of the gyroscope during at least one of the periods corresponding to the sample data set.

10. The apparatus of claim 9 wherein the processor is configured to determine the steadiness of the gyroscope as a function of the variance of the mean of the corresponding sample data set.

11. The apparatus of claim 9 wherein the processor is configured to weight the samples by applying a forgetting factor to the corresponding sample data set as a function of age of the sample data set.

12. The apparatus of claim 11 wherein the forgetting factor is a predetermined number of measurements generated by the gyroscope divided by a number of the measurements generated by the gyroscope accumulated in the sample data set.

13. The apparatus of claim 8 wherein the at least one other motion sensor is an accelerometer.

14. The apparatus of claim 13 wherein the at least one other motion sensor further comprises at least one of a magnetometer and a camera.

15. The apparatus of claim 8 wherein the processor is configured to calculate the mean and the variance of the mean as:

$$\text{mean}=\text{mean}*u+\text{newMean}*(1-u); \text{ and}$$

$$\text{variance of the mean}=u^2*\text{var}+(1-[)^2*\text{newVar}$$

wherein
mean is the accumulated state of the mean corresponding to a given temperature in the RLS fit;
var is the accumulated state of the variance of the mean corresponding to a given temperature in the RLS fit;
newMean is the mean of a new data set for the RLS fit;
newVar is the variance of the mean of the new data set for the RLS; and $$u=\text{newVar}/\text{newVar}+\text{var}.$$

16. The apparatus of claim 15 wherein the processor is configured to weight the sample data sets by 1/var.

17. The apparatus of claim 15 wherein the processor is configured to weight the sample data sets by 1/var up to a predetermined maximum weight.

18. The apparatus of claim 8 wherein the processor is configured to generate the RLS fit as:

$$y=P(0)*x+P(1)$$

wherein:
P is a 2 by 1 vector comprised of P(0) and P(1);

$$P=A\backslash b;$$

A is a 2 by 2 matrix accumulated as:

$$A(0,0)=A(0,0)+x^2*w$$

$$A(0,1)=A(0,1)+x*w$$

$$A(1,0)=A(1,0)+x*w; \text{ and}$$

$$A(1,1)=A(1,1)+w$$

B is a 2 by 1 vector accumulated as:

$b(0)=b(0)+x*y*w;$ and $b(1)=b(1)+y*w;$ y is the ZRO estimate of the corresponding sample data set;

x is the temperature of the corresponding sample data set; and w is the weight assigned to the corresponding sample data set.

19. The apparatus of claim 8 wherein the processor is further configured to:
   determine a second ZRO estimate based on a currently accumulated sample data set;
   determine a third ZRO estimate based on a most recently completed sample data set;
   calculate an estimated accuracy of each of the ZRO estimate, the second ZRO estimate, and the third ZRO estimate;
   select one of the ZRO estimate, the second ZRO estimate, and the third ZRO estimate having the greatest estimated accuracy; and
   apply the selected one of the ZRO estimate, the second ZRO estimate, and the third ZRO estimate to the measurements generated by the gyroscope.

20. The apparatus of claim 19 wherein the processor is configured to calculate the estimated accuracy of each of the ZRO estimate, the second ZRO estimate, and the third ZRO estimate by calculating mean squared errors (MSEs) thereof, wherein the processor is configured to calculate the MSEs of the second and third ZRO estimates as:

$$\text{MSEadjusted}=\text{var}+(\Delta T*\text{slope})^2$$

where
   $\Delta T$ is a difference in temperature between a current gyroscope temperature and a temperature of the corresponding sample data set;
   var is the variance of the mean of the corresponding sample data set; and
   slope is a slope of the RLS fit at the temperature corresponding to the sample data set.

21. The apparatus of claim 8 wherein the RLS fit is a quadratic fit.

* * * * *

UNITED STATES PATENT AND TRADEMARK OFFICE
CERTIFICATE OF CORRECTION

| | | |
|---|---|---|
| PATENT NO. | : 11,099,031 B2 | Page 1 of 1 |
| APPLICATION NO. | : 16/466727 | |
| DATED | : August 24, 2021 | |
| INVENTOR(S) | : Bryan A. Cook and Yun Li | |

It is certified that error appears in the above-identified patent and that said Letters Patent is hereby corrected as shown below:

In the Claims

At Column 24, Line 53, in Claim 1, delete "gyroscop" and insert --gyroscope--

At Column 25, Lines 3-4, in Claim 1, delete "measurement" and insert --measurements--

At Column 26, Line 35, in Claim 15, delete "newVar" and insert --newVar,--

At Column 26, Line 54, in Claim 18, delete "(1)" and insert --(1),--

At Column 26, Line 61, in Claim 18, delete "w" and insert --w;--

At Column 26, Line 63, in Claim 18, delete "w" and insert --w;--

At Column 26, Line 67, in Claim 18, delete "w" and insert --w;--

Signed and Sealed this
Twentieth Day of August, 2024

*Katherine Kelly Vidal*

Katherine Kelly Vidal
*Director of the United States Patent and Trademark Office*